United States Patent
Kinmont, Jr.

(10) Patent No.: US 10,449,466 B2
(45) Date of Patent: Oct. 22, 2019

(54) SPINNER HAVING DETACHABLE BASE AND STAND THEREFOR

(71) Applicant: Richard C. Kinmont, Jr., Roy, UT (US)

(72) Inventor: Richard C. Kinmont, Jr., Roy, UT (US)

(*) Notice: Subject to any disclaimer, the term of this patent is extended or adjusted under 35 U.S.C. 154(b) by 0 days.

(21) Appl. No.: 15/666,554

(22) Filed: Aug. 1, 2017

(65) Prior Publication Data

US 2017/0326468 A1 Nov. 16, 2017

(51) Int. Cl.
| | | |
|---|---|---|
| *A63H 1/00* | (2019.01) | |
| *A63H 33/26* | (2006.01) | |
| *A63H 33/06* | (2006.01) | |
| *A63H 33/00* | (2006.01) | |
| *B33Y 80/00* | (2015.01) | |
| *B33Y 50/00* | (2015.01) | |

(52) U.S. Cl.
CPC .............. *A63H 33/26* (2013.01); *A63H 1/00* (2013.01); *A63H 33/003* (2013.01); *A63H 33/067* (2013.01); *B33Y 50/00* (2014.12); *B33Y 80/00* (2014.12)

(58) Field of Classification Search
CPC ..................................................... A63H 1/00
See application file for complete search history.

(56) References Cited

U.S. PATENT DOCUMENTS

| | | | | |
|---|---|---|---|---|
| 454,804 | A * | 6/1891 | Murphy | |
| D156,773 | S * | 1/1950 | Schaper | A63H 33/40 446/236 |
| 2,656,643 | A * | 10/1953 | Brosseit | A63H 33/26 446/135 |
| 5,506,459 | A * | 4/1996 | Ritts | A63H 1/00 310/90.5 |
| 5,591,062 | A | 1/1997 | Hettinger | 446/46 |
| 6,530,816 | B1 * | 3/2003 | Chiu | A63H 33/40 446/217 |
| 6,773,328 | B2 * | 8/2004 | Tiefel | A63H 1/00 446/459 |
| 9,895,620 | B1 * | 2/2018 | Walterscheid | A63H 1/24 |
| 9,914,063 | B1 * | 3/2018 | McCoskery | A63H 29/08 |
| 2008/0194173 | A1 * | 8/2008 | Tiefel | A63H 1/04 446/236 |
| 2010/0233934 | A1 * | 9/2010 | Tonary | G09F 17/00 446/217 |
| 2011/0009028 | A1 * | 1/2011 | Gurdin | A63F 9/0819 446/132 |
| 2015/0343318 | A1 * | 12/2015 | Liang | A63H 1/00 446/259 |

* cited by examiner

*Primary Examiner* — John A Ricci

(74) *Attorney, Agent, or Firm* — Michael R. Schramm

(57) ABSTRACT

The present invention is a spinner device adapted for use as a toy or amusement device and in relieving stress. The spinner device preferably includes a plurality of radially extending arms, each arm having a magnetic mass therein and being magnetically mass adjustable. The spinner device preferably includes a magnetically attachable and detachable base device that allows the spinner device to function as a top. The spinner device further preferably includes a magnetically attachable and detachable display stand device that allows the spinner device to be rotated or spun while being displayed.

18 Claims, 10 Drawing Sheets

SPINNER HAVING DETACHABLE BASE AND STAND THEREFOR

FIELD OF THE INVENTION

The invention relates to spinning toys, and in particular, to so-called fidget spinners (see Appendix A) for use in amusement and in relieving stress.

BACKGROUND OF THE INVENTION

Various spinning type toys and devices are well known and have been used for many years. Recently, fidget spinners have become highly popular (see Appendix B). Examples of various spinning devices are disclosed in Appendix A and U.S. Pat. No. 5,591,062 to Hettinger, all of which are expressly incorporated herein by reference.

SUMMARY OF THE INVENTION

The present invention is a spinner device adapted for use as a toy or amusement device and in relieving stress. The spinner device preferably includes a plurality of radially extending arms, each arm having a magnetic mass therein and being magnetically mass adjustable. The spinner device preferably includes a magnetically attachable and detachable base device that allows the spinner device to function as a top (see Appendix C). The spinner device further preferably includes a magnetically attachable and detachable display stand device that allows the spinner device to be rotated or spun while being displayed.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
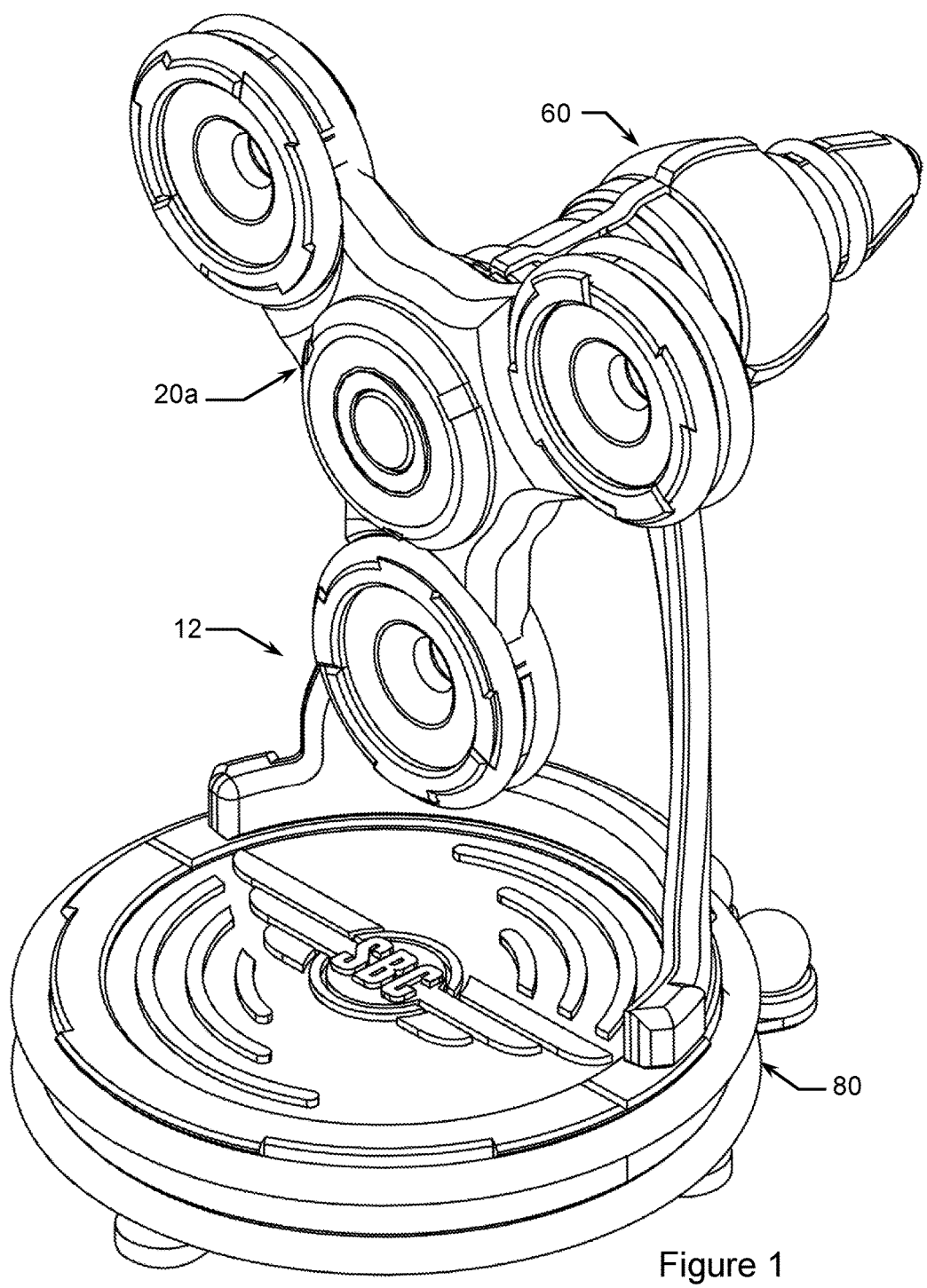
FIG. 1 is a front trimetric view of the spinner apparatus in a static displayed configuration.
Figure 2:
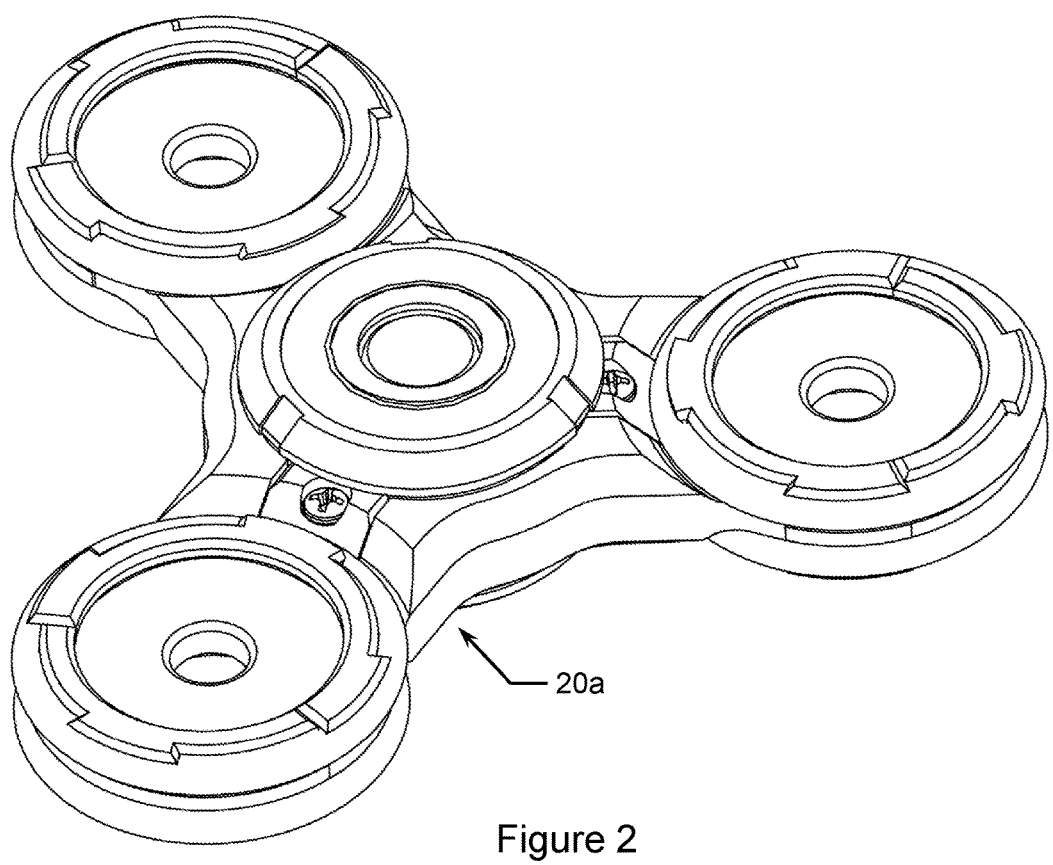
FIG. 2 is a front trimetric view of the spinner device.
Figure 3:
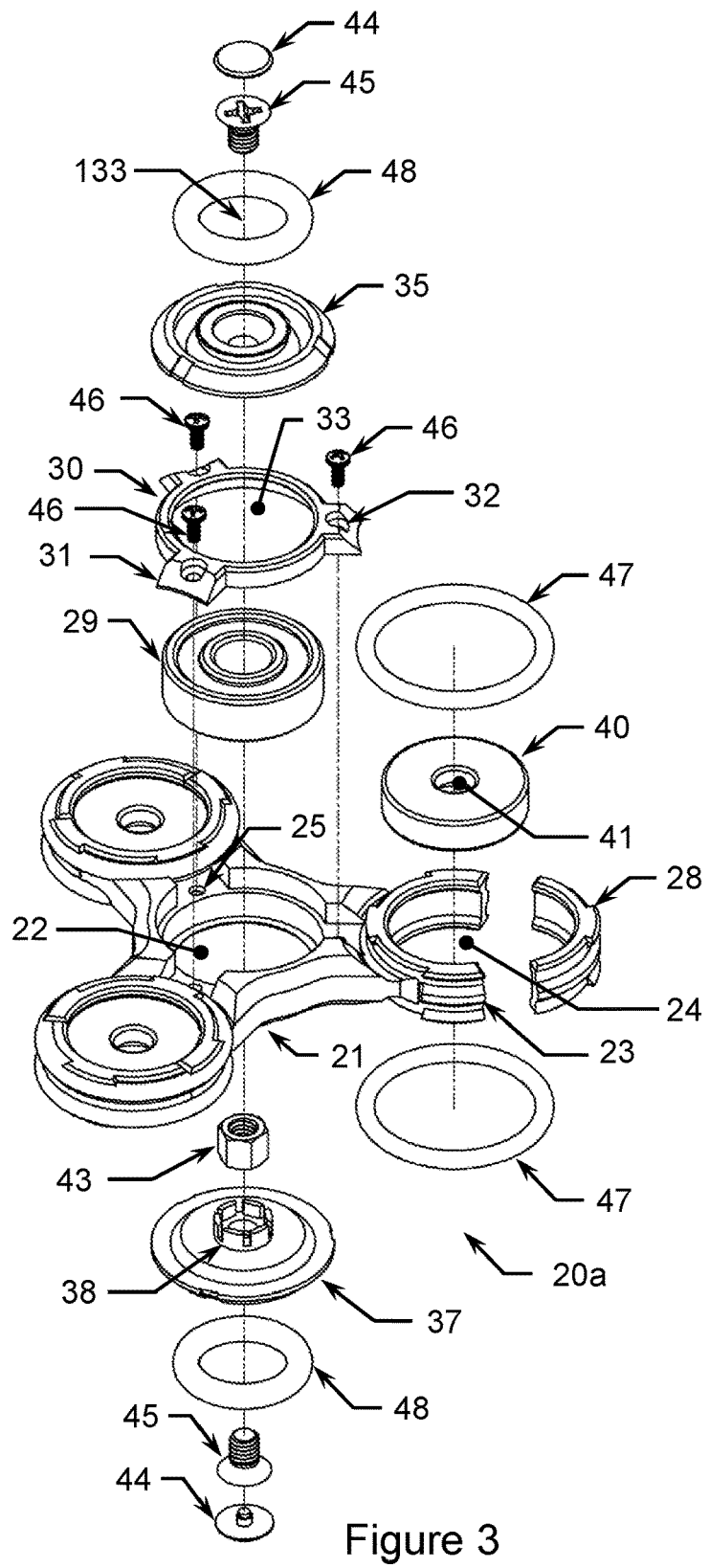
FIG. 3 is a front exploded trimetric view of the spinner device with "explosion lines" shown in phantom lines.
Figure 4:
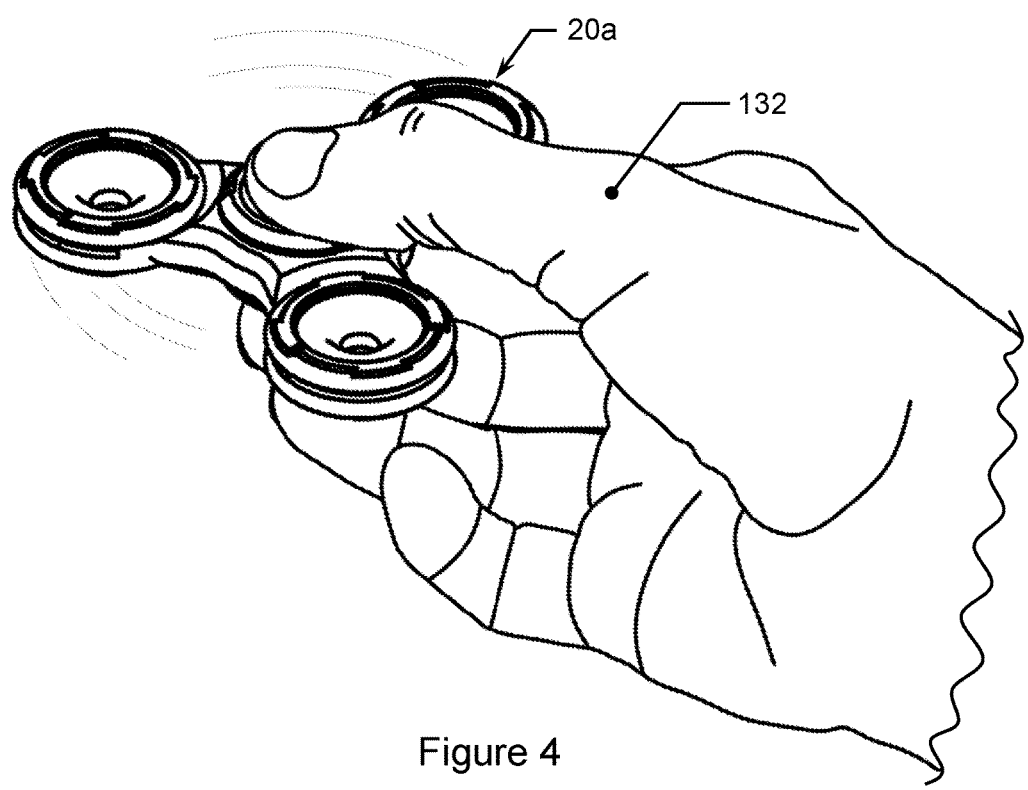
FIG. 4 is a front trimetric view of the spinner device being held by a human hand while spinning.
Figure 5:
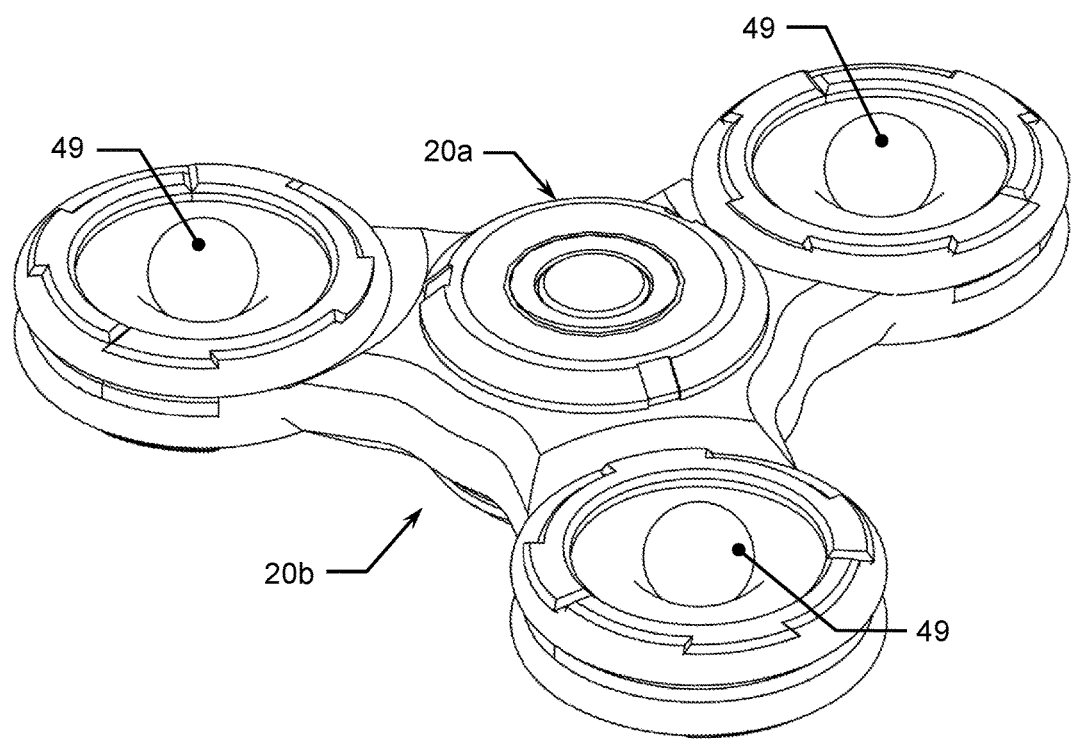
FIG. 5 is an inverted front trimetric view of the spinner device with additional mass magnetically adhered thereto.
Figure 6:
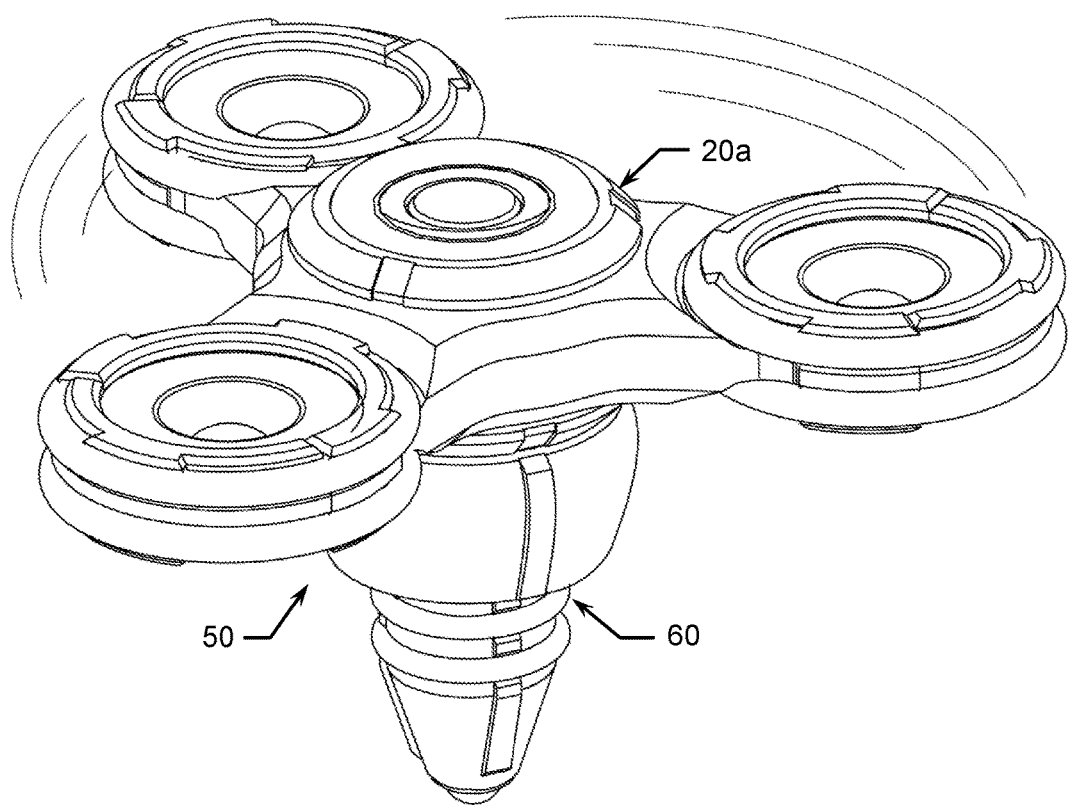
FIG. 6 is a font trimetric view of the spinner top in a spinning configuration.
Figure 7:
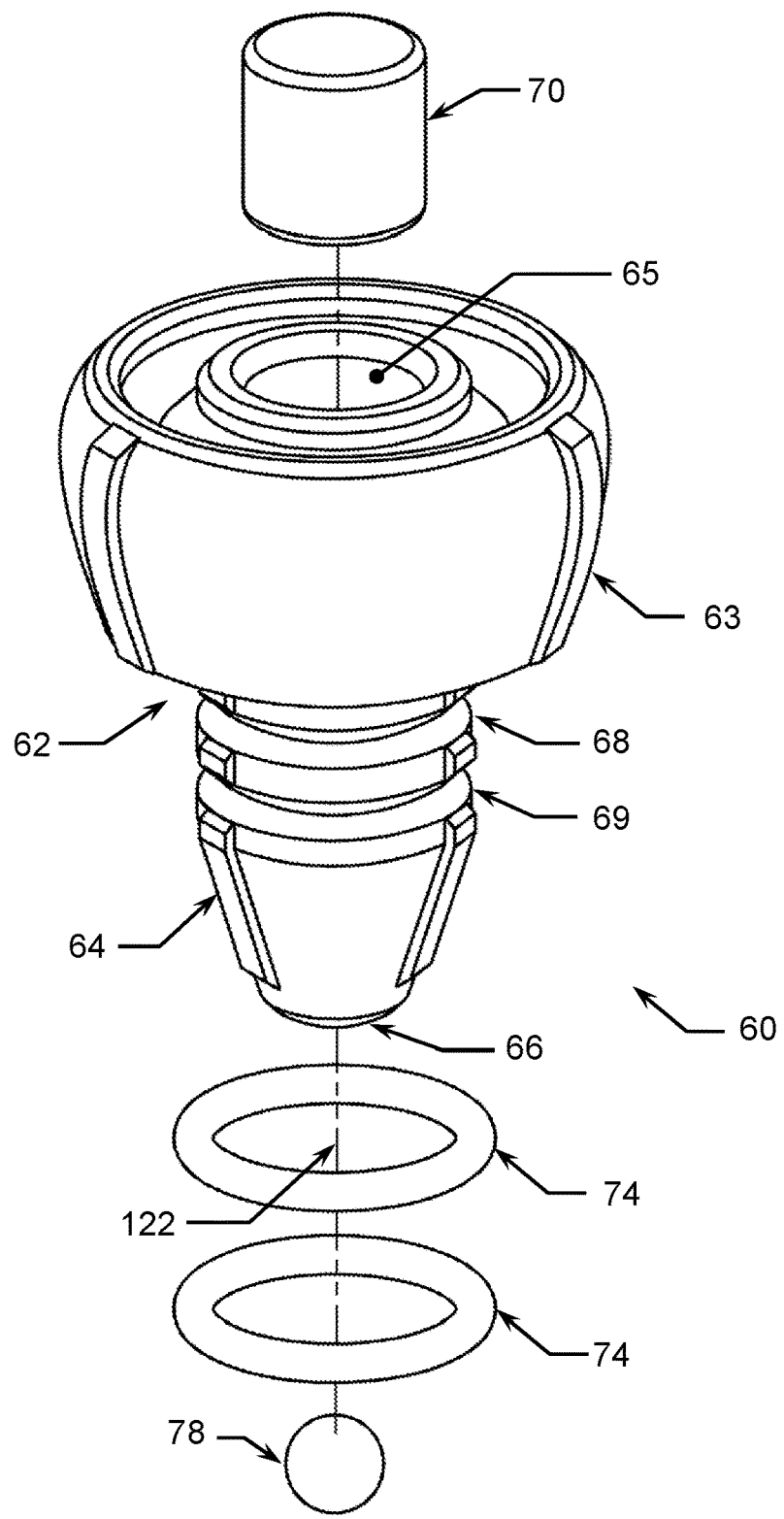
FIG. 7 is a front exploded trimetric view of the display stand device with "explosion lines" shown in phantom lines.
Figure 8:
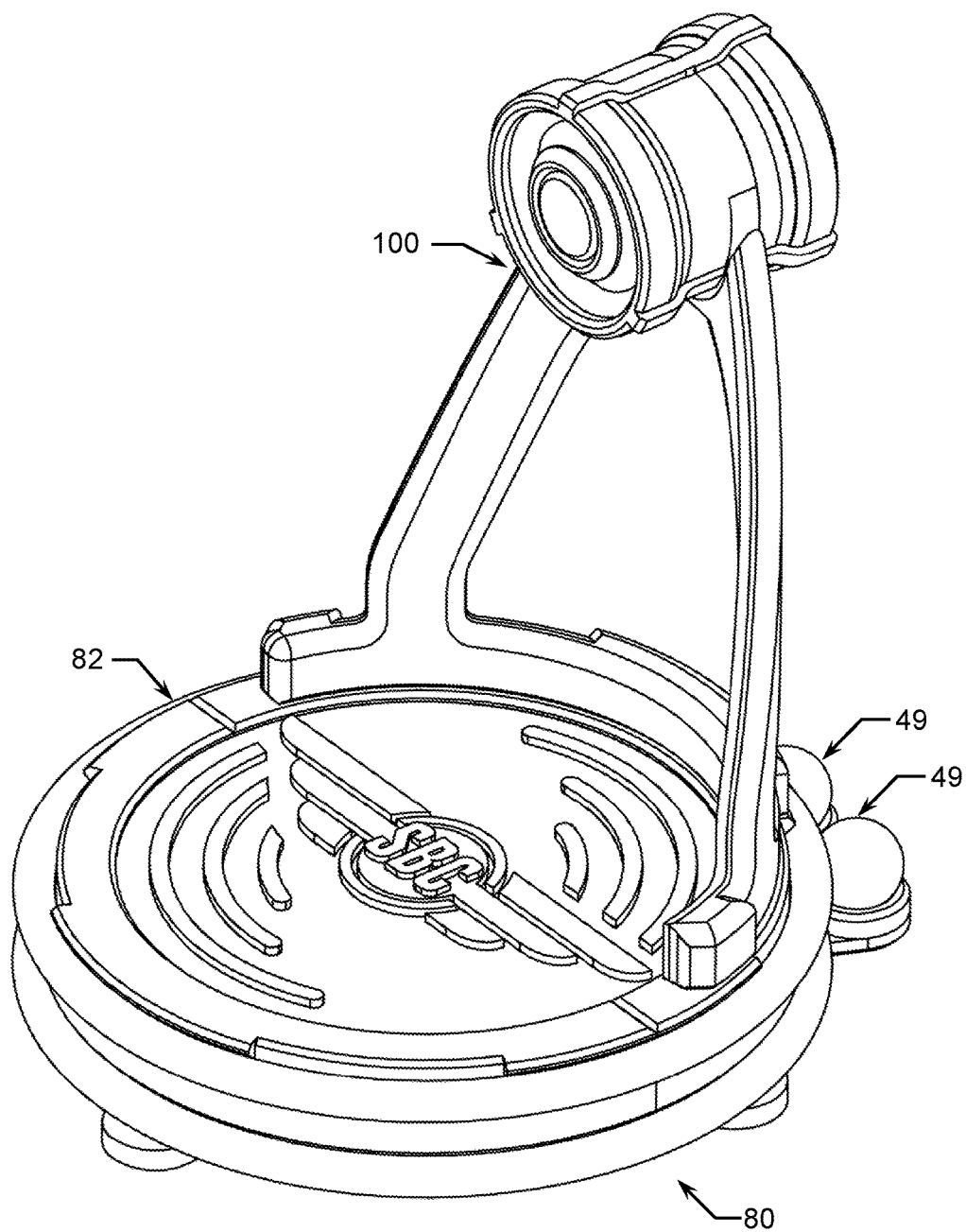
FIG. 8 is a front trimetric view of the display stand device.
Figure 9:
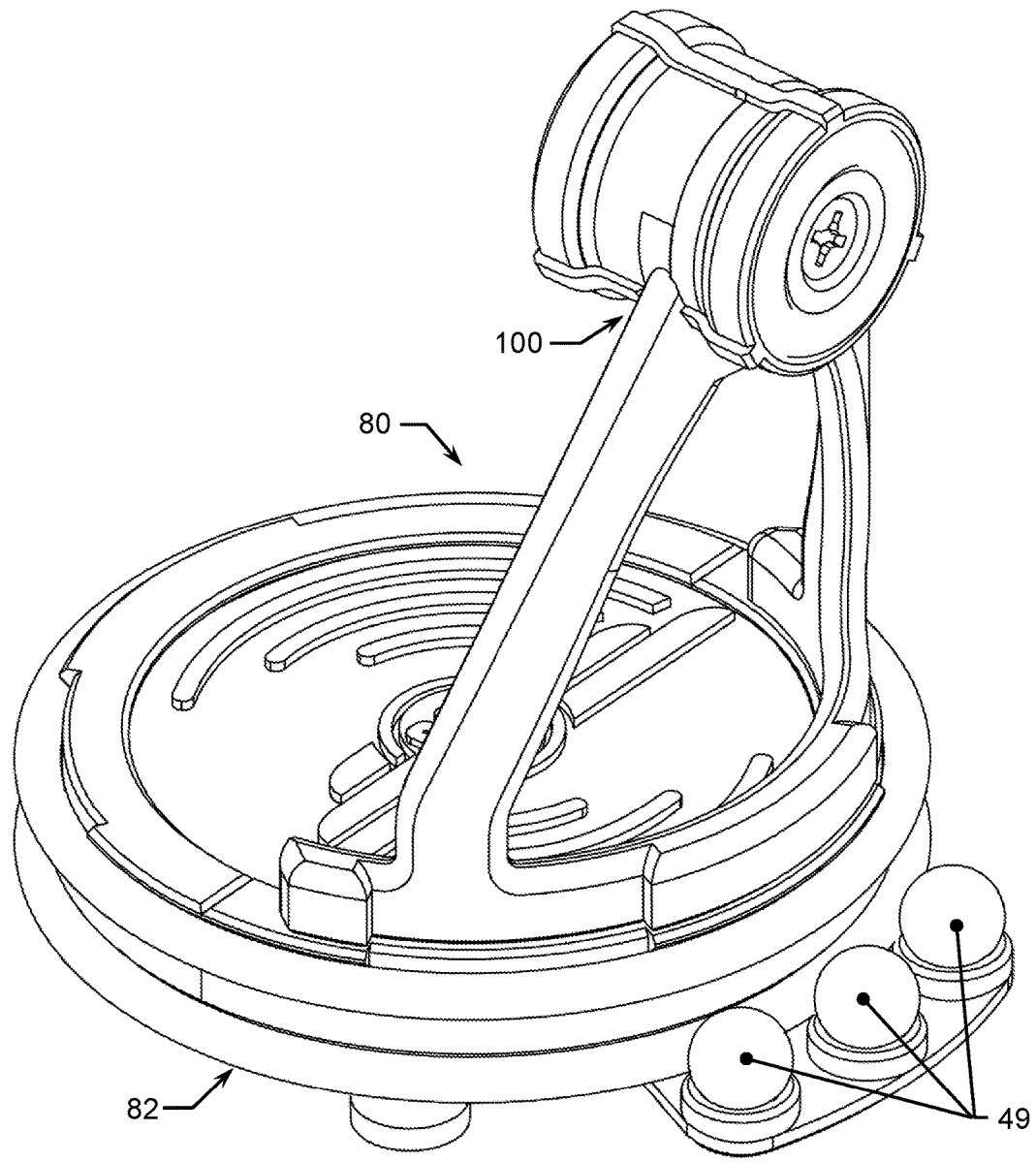
FIG. 9 is a rear trimetric view of the display stand device.
Figure 10:
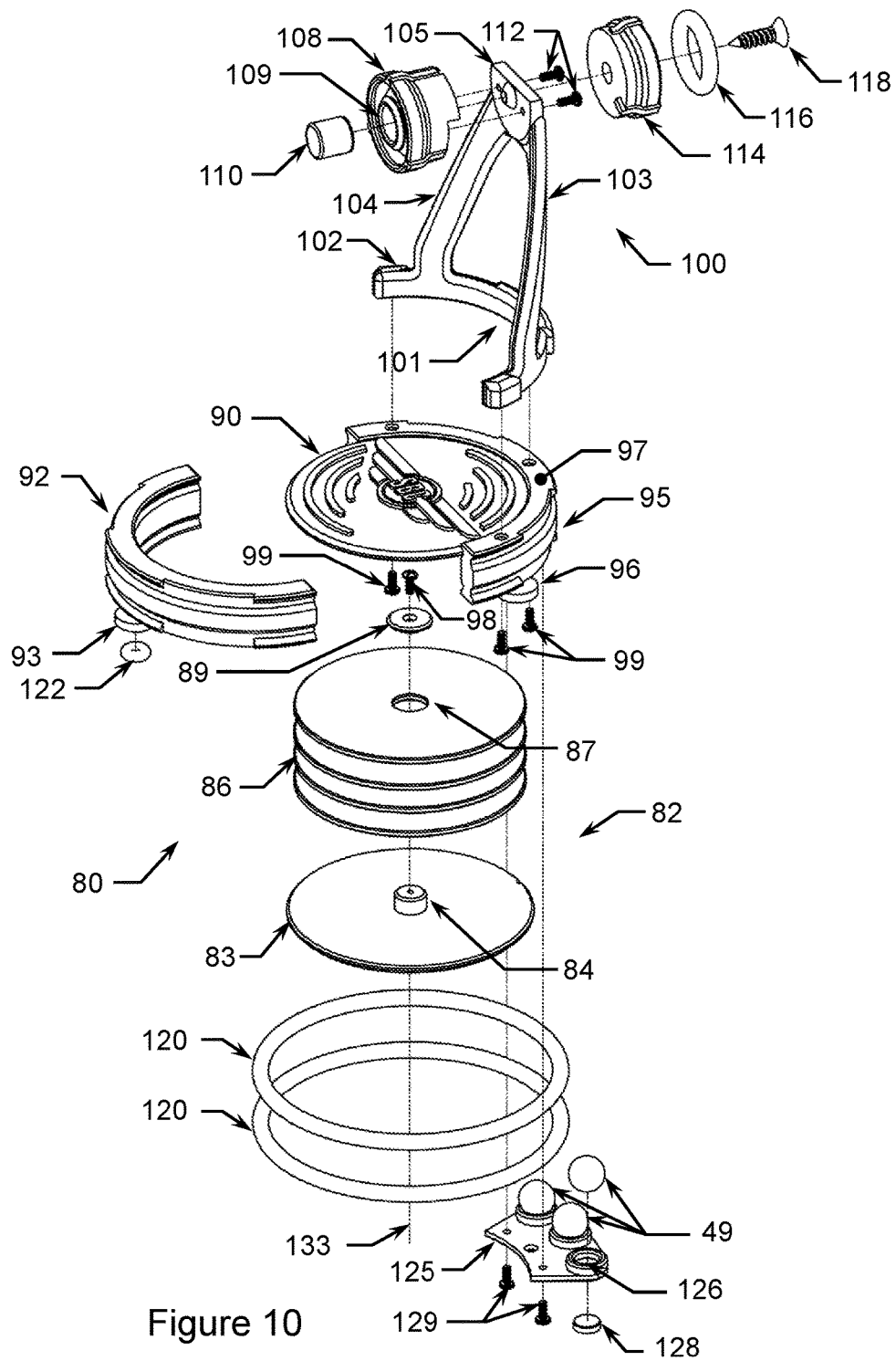
FIG. 10 is an exploded trimetric view of the display stand device with "explosion lines" shown in phantom lines.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| # | Feature | # | Feature |
|---|---------|---|---------|
| 12 | Spinner apparatus | 20a | Spinner device |
| 20b | Spinner device | 21 | Spinner body |
| 22 | Bearing cavity | 23 | Arm |
| 24 | Magnet cavity | 25 | Threaded hole |
| 28 | Magnet cap | 29 | Bearing |
| 30 | Retainer ring | 31 | Flange |
| 32 | Threaded hole | 33 | Central opening |
| 35 | Upper bearing cover | 37 | Lower bearing cover |
| 38 | Nut retention pocket | 40 | Magnet |
| 41 | Magnet central recess | 43 | Nut |
| 44 | Screw cover | 45 | Screw |
| 46 | Screw | 47 | O-ring |
| 48 | O-ring | 49 | Ball |
| 50 | Spinner top | 60 | Base device |
| 62 | Base body | 63 | Base barrel |
| 64 | Base cone | 65 | Base central opening |
| 66 | Base tip | 68 | Upper ring groove |
| 69 | Lower ring groove | 70 | Magnet |
| 74 | O-ring | 78 | Ball |
| 80 | Display stand device | 82 | Base |
| 83 | Lower disc | 84 | Hub |
| 86 | Drum | 87 | Drum opening |
| 89 | Grommet | 90 | Upper disc |
| 92 | Front housing | 93 | Foot |
| 95 | Rear housing | 96 | Foot |
| 97 | Shelf | 98 | Screw |
| 99 | Screw | 100 | Arm device |
| 101 | Strut | 102 | Foot |
| 103 | First arm | 104 | Second arm |
| 105 | Mounting flange | 108 | Spindle |
| 109 | Magnet pocket | 110 | Magnet |
| 112 | Screw | 114 | Collar |
| 116 | O-ring | 118 | Screw |
| 120 | O-ring | 122 | O-ring |
| 125 | Table | 126 | Magnet recess |
| 128 | Magnet | 129 | Screw |
| 132 | Human hand | 133 | Explosion line |

Referring now to the drawings, the invention is a spinner apparatus 12 for use as a toy or amusement device in manually spinning a spinner, spinning a spinner as a top, and displaying a spinning spinner on a display stand comprising spinner device 20a, optional balls 49, base device 60, and stand 80.

Spinner device 20a defines a so-called "fidget spinner" type spinner device comprising body 21, a plurality of magnet caps 28, a plurality of bearings 29, retainer ring 30, upper bearing cover 35, lower bearing cover 37, a plurality of magnets 40, nut 43, screw cover 44, a plurality of screws 45, a plurality of screws 46, a plurality of O-rings 47, and a plurality of O-rings 48.

Spinner device body 21 defines a preferably plastic body preferably compatible with an additive manufacturing or 3D printing process having a bearing cavity 22, a plurality of arms 23, a plurality of magnet cavities 24, and a plurality of threaded holes 25. Magnet cap 28 defines a generally arcuate shaped and preferably plastic cap preferably compatible with an additive manufacturing or 3D printing process. Bearing 29 preferably defines a standard commercially available metal bearing adapted to have an inner race rotatable relative to an outer race. Retainer ring 30 defines a generally ring shaped and preferably plastic ring preferably compatible with an additive manufacturing or 3D printing process having a plurality of flanges 31, a plurality of threaded holes 32, and a central opening 33. Upper bearing cover 35 defines a generally disk shaped and preferably plastic cover preferably compatible with an additive manufacturing or 3D printing process. Lower bearing cover 37 defines a generally disk shaped and preferably plastic cover preferably compatible with an additive manufacturing or 3D printing process having a nut retention pocket 38. Magnet 40 preferably defines a standard commercially available metal magnet having a central recess. Nut 43 preferably defines a standard commercially available metal threaded nut. Screw cover cover 44 defines a generally disk shaped and preferably plastic cover preferably compatible with an additive manufacturing or 3D printing process. Screw 45 preferably defines a standard commercially available metal threaded screw. Screw 46 preferably defines a standard commercially available metal threaded screw. O-ring 47 preferably defines a standard commercially available elastomeric O-ring. O-ring 48 preferably defines a standard commercially available elastomeric O-ring.

Ball 49 preferably defines a standard commercially available spherical ferromagnetic metal ball.

Spinner device 20*a* is assembled such that bearing 29 is pressed into cavity 22, a magnet 40 is pressed into each of magnet cavities 24, caps 28 are positioned onto each of magnets 40 and holding communication with each of arms 23, two O-rings 47 each are elastically positioned in place on each of arms 23 and caps 28, retainer ring 30 is threadingly attached to body 21 by means of screws 46 and threaded holes 25, upper bearing cover 35 positioned in opening 33, O-ring 48 is pressed into cover 35, nut 43 is pressed into retention pocket 38 and lower bearing cover 37 positioned in contact with cavity 22, O-ring 48 is pressed into cover 37, one each of screws 45 is threaded through covers 35 and 37 and retentively threaded into nut 43, and covers 44 are pressed into contact with screws 45.

With spinner device 20*a* thus assembled, spinner device 20*a* may be spun between a user's fingers, spun when assembled to a base to form a top, and spun on a display stand. It shall be noted that O-rings 47 not only function to retain caps 28 to arms 23, O-rings 47 function to provide for strain relief and shock resistance or energy attenuation if spinner device 20*a* is dropped or struck, so as to prevent breaking spinner device 20*a*. O-rings 47 also provide for enhanced grip of spinner device 20*a* for a user. It shall also be noted that covers 35 and 37 are centrally dished (concaved shaped) so as to provide for self-centering of spinner device 20*a* in a user's fingers. If a user decides to increase the mass of spinner device 20*a* (i.e. so as to increase spin dwell time), the user may merely place a ball 49 in each of recesses 41, whereby balls 49 are magnetically retained to magnets 40 and thereby form spinner device 20*b*.

Base device 60 comprises base body 62, magnet 70, a plurality of O-rings 74, and a ball 78.

Base body 62 defines a preferably plastic body preferably compatible with an additive manufacturing or 3D printing process having a barrel 63, a cone 64, a central opening 65, a tip 66, upper ring groove 68, and lower ring groove 69. Magnet 70 preferably defines a generally cylindrical standard commercially available metal magnet. O-ring 74 preferably defines a standard commercially available elastomeric O-ring. Ball 78 preferably defines a standard commercially available spherical ferromagnetic metal ball.

Base device 60 is assembled such that a first O-ring 74 is elastically positioned in upper ring groove 68, a second O-ring 74 is elastically positioned in lower ring groove 69, magnet 70 is pressed into central opening 65, and ball 78 is pressed into tip 66.

Spinner top 50 comprises spinner device 20*a* and a base device 60. Spinner top 50 is assembled such that spinner device 20*a* is magnetically and rotatable attached to base device 60 by means of magnet 70.

With spinner top 50 thus assembled, spinner device 20*a* may be spun while magnetically attached to base device 60 and then spinner top 50 may be placed on a substantially hard flat surface and spinner top 50 will spin for a period of time while balancing on ball 78.

Display stand device 80 comprises a base 82, an arm device 100, screws 99, and optionally balls 49.

Base 82 comprises a lower disc 83, a drum 86, a grommet 89, an upper disc 90, a front housing 92, a rear housing 95, a screw 98, a plurality of O-rings 120, a plurality of O-rings 122, a table 125, a plurality of magnets 128, and a plurality of screws 129.

Lower disc 83 defines a preferably substantially flat plastic disc preferably compatible with an additive manufacturing or 3D printing process having a hub 84. Drum 86 defines a preferably hollow plastic drum preferably compatible with an additive manufacturing or 3D printing process having an opening 87. Grommet 89 preferably defines a standard commercially available elastomeric grommet. Upper disc 90 defines a preferably substantially flat plastic disc preferably compatible with an additive manufacturing or 3D printing process. Front housing 92 defines a preferably substantially arcuate shaped plastic housing preferably compatible with an additive manufacturing or 3D printing process having at least one foot 93. Rear housing 95 defines a preferably substantially arcuate shaped plastic housing preferably compatible with an additive manufacturing or 3D printing process having at least one foot 96 and a shelf 97. Screw 98 preferably defines a standard commercially available metal threaded screw. O-ring 120 preferably defines a standard commercially available elastomeric O-ring. O-ring 122 preferably defines a standard commercially available elastomeric O-ring. Table 125 defines a preferably substantially flat plastic table preferably compatible with an additive manufacturing or 3D printing process having a plurality of magnet recesses 126. Magnet 128 preferably defines a generally disc shaped standard commercially available metal magnet. Screw 129 preferably defines a standard commercially available metal threaded screw.

Base 82 is assembled such that grommet 89 is pressed into opening 87, upper disc 90 is positioned on and pressed into grommet 89, hub 84 of lower disc 83 is pressed into a lower surface of drum 86, screw 98 is threaded through grommet 89 and into hub 84, front housing 92 is positioned on a front side of drum 86, rear housing 95 is positioned on a back side of drum 86, O-rings 120 are elastically positioned around front housing 92 and rear housing 95 so as to secure front housing 92 and rear housing 95, O-rings 122 are elastically secured to feet 93 and feet 96, one each of magnets 128 are press-fit into each of magnet recesses 126, and table 125 is secured to rear housing 95 by means of screws 129.

Arm device 100 comprises a strut 101, a spindle 108, a magnet 110, a plurality of screws 112, a collar 114, an O-ring 116, and a screw 118.

Strut 101 defines a preferably substantially elongated plastic strut preferably compatible with an additive manufacturing or 3D printing process having a foot 102, a first arm 103, a second arm 104, and a mounting flange 105. Spindle 108 defines a preferably cylindrical plastic spindle preferably compatible with an additive manufacturing or 3D printing process having a magnet pocket 109. Magnet 110 preferably defines a generally cylindrical shaped standard commercially available metal magnet. Screws 112 preferably define standard commercially available metal threaded screws. O-ring 116 preferably defines a standard commercially available elastomeric O-ring. Screw 118 preferably defines a standard commercially available metal threaded screw.

Arm device 100 is assembled such that magnet 110 is pressed into magnet pocket 109, spindle 108 is fastened to mounting flange 105 by means of screws 112, O-ring 116 is pressed into collar 114, and collar 114 is fastened to mounting flange 105 by means of screw 118.

Display stand device 80 is assembled such that foot 102 of strut 101 of arm device 100 is fastened to shelf 97 of rear housing 95 of base 82 by means of screws 99. Balls 49 may optionally be magnetically retained in magnet recesses 126 when balls 49 are not in use.

Spinner apparatus 12 is assembled such that base device 60 is magnetically adhered to display stand 80 by placing magnet 70 into magnetic contact with screw 118, and such that spinner device 20a is rotatably positioned on display stand 80 by placing bearing 29 into magnetic retention positioning with magnet 110.

With spinner apparatus 12 thus assembled, spinner device 20a as wells as base device 60 and balls 49 may be statically displayed. Further, with spinner apparatus 12 thus assembled, spinner device 20a may be spun while being retained on display stand 80. Moreover, a user may spin spinner device 20a between his fingers, and then while still spinning, spinner device 20a may be magnetically adhered to and displayed on stand 80. It shall be noted that in one embodiment, spinner apparatus 12 is provided as an assembled completed product and in another embodiment spinner apparatus 12 is provided as a kit preferably comprising entirely of COTS (commercial off-the-shelf) parts and either 3D printed (or like additive manufactured) parts or the 3D CAD (Computer Aided Design) models (e.g. STL files) that can be printed to create such parts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A handheld spinner apparatus having a substantially centrally located bearing and a plurality of lobes radiating substantially outwardly from a center thereof and being substantially equidistantly spaced, wherein each of said lobes include a magnet embedded therein, and wherein said spinner apparatus defines at least one of a spinner apparatus having at least one strain relieving lobe protruding therefrom, a spinner apparatus having a user magnetically adjustable mass, and a combination thereof.

2. The spinner apparatus of claim 1 wherein said bearing has a concave upper cap and a concave lower cap engaged thereto such that when a user grasps said spinner apparatus and rotates said spinner apparatus, said spinner apparatus substantially self-centers within said user's grasp.

3. The spinner apparatus of claim 1 wherein said strain relieving lobe defines a multi-piece lobe wherein said lobe pieces are elastically held together such that if said lobe is impacted, said lobe will stain relievingly flex.

4. The spinner apparatus of claim 1 wherein said mass is adjustable by magnetically adhering at least one ferromagnetic member to at least one magnet.

5. The spinner apparatus of claim 4 wherein said mass is adjustable by magnetically adhering a ferromagnetic ball to each of said magnets embedded in said lobes.

6. The spinner apparatus of claim 1 wherein said spinner apparatus includes a body, and wherein said body is constructible via an additive manufacturing process.

7. The spinner apparatus of claim 1 wherein said spinner apparatus comprises a user assembleable kit consisting of a combination of COTS parts and at least one of 3D printed parts and CAD files adapted to enabled 3D printing of such parts.

8. A reconfigurable handheld spinner apparatus wherein said spinner apparatus is reconfigurable into at least one of a multi-lobed spinner device being rotatably magnetically attached to a base so as to form a spinnable top, and a spinner device being rotatably magnetically attached to a display stand such that said spinner device is displayable on said stand while rotating.

9. The spinner apparatus of claim 8 wherein said spinner device includes a substantially centrally located bearing and a plurality of lobes radiating substantially outwardly from a center thereof and being substantially equidistantly spaced.

10. The spinner apparatus of claim 9 wherein each of said lobes include a magnet embedded therein.

11. The spinner apparatus of claim 8 wherein said spinner device includes a substantially centrally located bearing, said bearing having a concave upper cap and a concave lower cap engaged thereto such that when a user grasps said spinner device and rotates said spinner device, said spinner device substantially self-centers within said user's grasp.

12. The spinner apparatus of claim 8 wherein said spinner device includes at least one strain relieving lobe defining a multi-piece lobe wherein said lobe pieces are elastically held together such that if said lobe is impacted, said lobe will stain relievingly flex.

13. The spinner apparatus of claim 8 wherein the mass of said apparatus is adjustable by magnetically adhering at least one ferromagnetic member to at least one magnet thereof.

14. The spinner apparatus of claim 13 wherein said spinner device includes a plurality of lobes radiating substantially outwardly from a center thereof and being substantially equidistantly spaced, wherein each of said lobes include a magnet embedded therein, and wherein said mass is adjustable by magnetically adhering a ferromagnetic ball to each of said magnets.

15. The spinner apparatus of claim 8 wherein said spinner device includes a body, and wherein said body is constructible via an additive manufacturing process.

16. The spinner apparatus of claim 8 wherein said spinner apparatus comprises a user assembleable kit consisting of a combination of COTS parts and at least one of 3D printed parts and CAD files adapted to enabled 3D printing of such parts.

17. A reconfigurable handheld spinner apparatus having at least one magnet incorporated therein, at least one strain relieving lobe protruding therefrom, and having a user adjustable mass, wherein said spinner apparatus is reconfigurable in a first instance into a spinner apparatus being rotatably magnetically attached to a base so as to form a spinnable top, and in a second instance into a spinner apparatus being rotatably magnetically attached to a display stand such that said spinner apparatus is displayable on said stand while rotating.

18. The spinner apparatus of claim 17 wherein said spinner apparatus comprises a user assembleable kit consisting of a combination of COTS parts and at least one of 3D printed parts and CAD files adapted to enabled 3D printing of such parts.

* * * * *